United States Patent
Chang

(10) Patent No.: US 8,783,960 B2
(45) Date of Patent: Jul. 22, 2014

(54) DUST-PROOF HOUSING DEVICE FOR AN ASSEMBLY AND BEARING ASSEMBLY INCLUDING THE SAME

(71) Applicant: Thai Dieng Industry Co., Ltd., Taichung (TW)

(72) Inventor: Chih-Hsien Chang, Taichung (TW)

(73) Assignee: Thai Dieng Industry Co., Ltd., Taichung (TW)

( * ) Notice: Subject to any disclaimer, the term of this patent is extended or adjusted under 35 U.S.C. 154(b) by 0 days.

(21) Appl. No.: 13/665,540

(22) Filed: Oct. 31, 2012

(65) Prior Publication Data

US 2014/0119683 A1  May 1, 2014

(51) Int. Cl.
*F16C 33/76* (2006.01)
(52) U.S. Cl.
USPC ......................................... 384/477
(58) Field of Classification Search
USPC .......... 384/477, 484, 485, 486, 606, 607, 609
See application file for complete search history.

(56) References Cited

U.S. PATENT DOCUMENTS

| | | | | |
|---|---|---|---|---|
| 4,726,696 A | * | 2/1988 | Dickinson et al. | 384/477 |
| 4,854,749 A | * | 8/1989 | Kohigashi et al. | 384/482 |
| 5,544,963 A | * | 8/1996 | Kajihara et al. | 384/482 |
| 5,618,116 A | * | 4/1997 | Ishikawa | 384/607 |
| 5,927,864 A | * | 7/1999 | Feerick | 384/482 |
| 2006/0177167 A1 | * | 8/2006 | Tsujimoto | 384/486 |
| 2006/0291761 A1 | * | 12/2006 | Gietl et al. | 384/486 |
| 2007/0147718 A1 | * | 6/2007 | Takimoto | 384/486 |
| 2008/0292231 A1 | * | 11/2008 | Matsui | 384/486 |
| 2009/0226125 A1 | * | 9/2009 | Ishii | 384/486 |
| 2010/0142873 A1 | * | 6/2010 | Sugiura | 384/477 |
| 2011/0206311 A1 | * | 8/2011 | Dittmer et al. | 384/607 |

* cited by examiner

*Primary Examiner* — James Pilkington
*Assistant Examiner* — Richard Urbanski
(74) *Attorney, Agent, or Firm* — Alston & Bird LLP

(57) ABSTRACT

A dust-proof housing device is adapted for a bearing assembly and includes a housing body that includes two housing-half walls, each of which has a central hole defining an axis, and an inner peripheral end surrounding the central hole. A dust-proof cover has a fixing ring fitted in the inner peripheral end of at least one of the housing-half walls, and an annular flexible member secured to the fixing ring.

10 Claims, 4 Drawing Sheets

DUST-PROOF HOUSING DEVICE FOR AN ASSEMBLY AND BEARING ASSEMBLY INCLUDING THE SAME

BACKGROUND OF THE INVENTION

1. Field of the Invention

The invention relates to a dust-proof mechanical element, more particularly to a dust-proof housing device for a bearing assembly, and to a bearing assembly including the dust-proof housing device.

2. Description of the Related Art

Referring to FIG. 1, a conventional bearing assembly includes two housing-half walls 11 that abut against each other, an outer ring 12 that is disposed between the two housing-half walls 11, an inner ring 13 that is separately inserted in the outer ring 12, a plurality of balls 14 movably disposed between the outer and inner rings 12, 13, and two dust-proof rings 15 that are disposed between the outer and inner rings 12, 13 on two axially opposite sides of the balls 14, respectively. By virtue of the dust-proof rings 15, the balls 14 of the conventional bearing assembly can be isolated from environmental contaminants, and thus, the balls 14 can be prevented from locking or being damaged.

However, when the environmental contaminants are massively accumulated, the environmental contaminants gradually shove the dust-proof rings 15 and enter into the conventional bearing assembly. In view of this, there is still a need for further improvement of the conventional bearing assembly.

SUMMARY OF THE INVENTION

Therefore, the object of the present invention is to provide a dust-proof housing device and a bearing assembly including the dust-proof housing device that can alleviate the aforesaid drawback of the prior art.

According to one aspect of this invention, a dust-proof housing device for a bearing assembly includes a housing body and a dust-proof cover.

The housing body includes two housing-half walls, each of which has a central hole defining an axis, and an inner peripheral end surrounding the central hole.

The dust-proof cover has a fixing ring fitted in the inner peripheral end of at least one of the housing-half walls, and an annular flexible member secured to the fixing ring.

According to another aspect of this invention, a bearing assembly includes a bearing unit and the abovementioned dust-proof housing device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
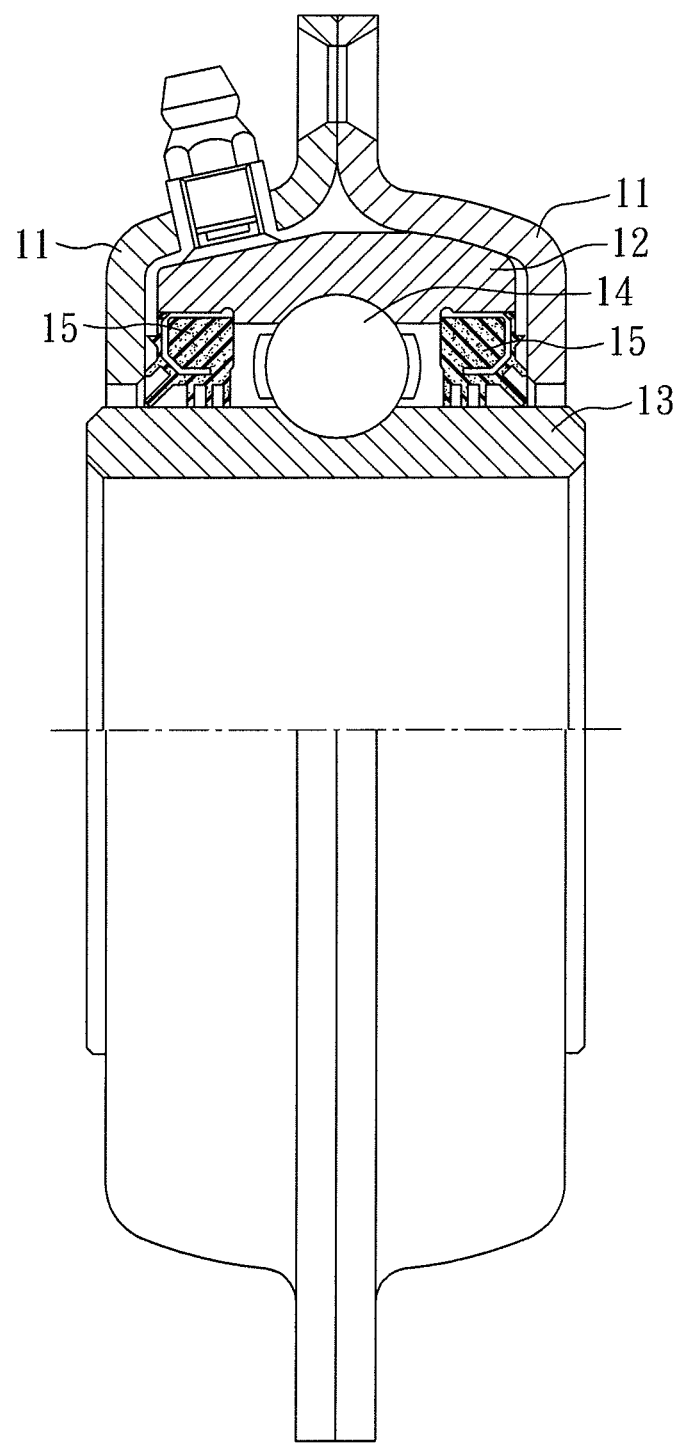
FIG. 1 is a partly sectional view of a conventional bearing assembly.
Figure 2:
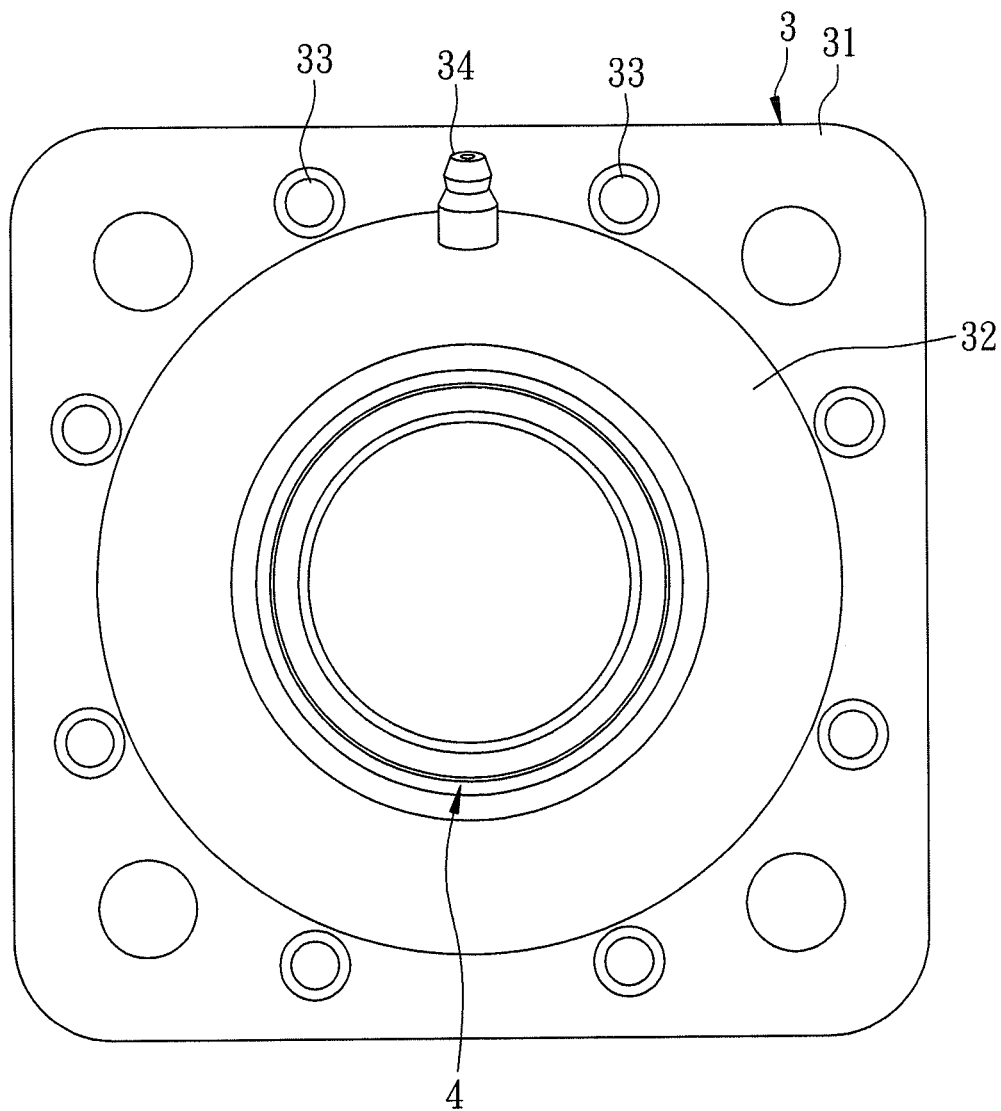
FIG. 2 is a front view showing the preferred embodiment of a bearing assembly including a dust-proof housing device according to the present invention.
Figure 3:
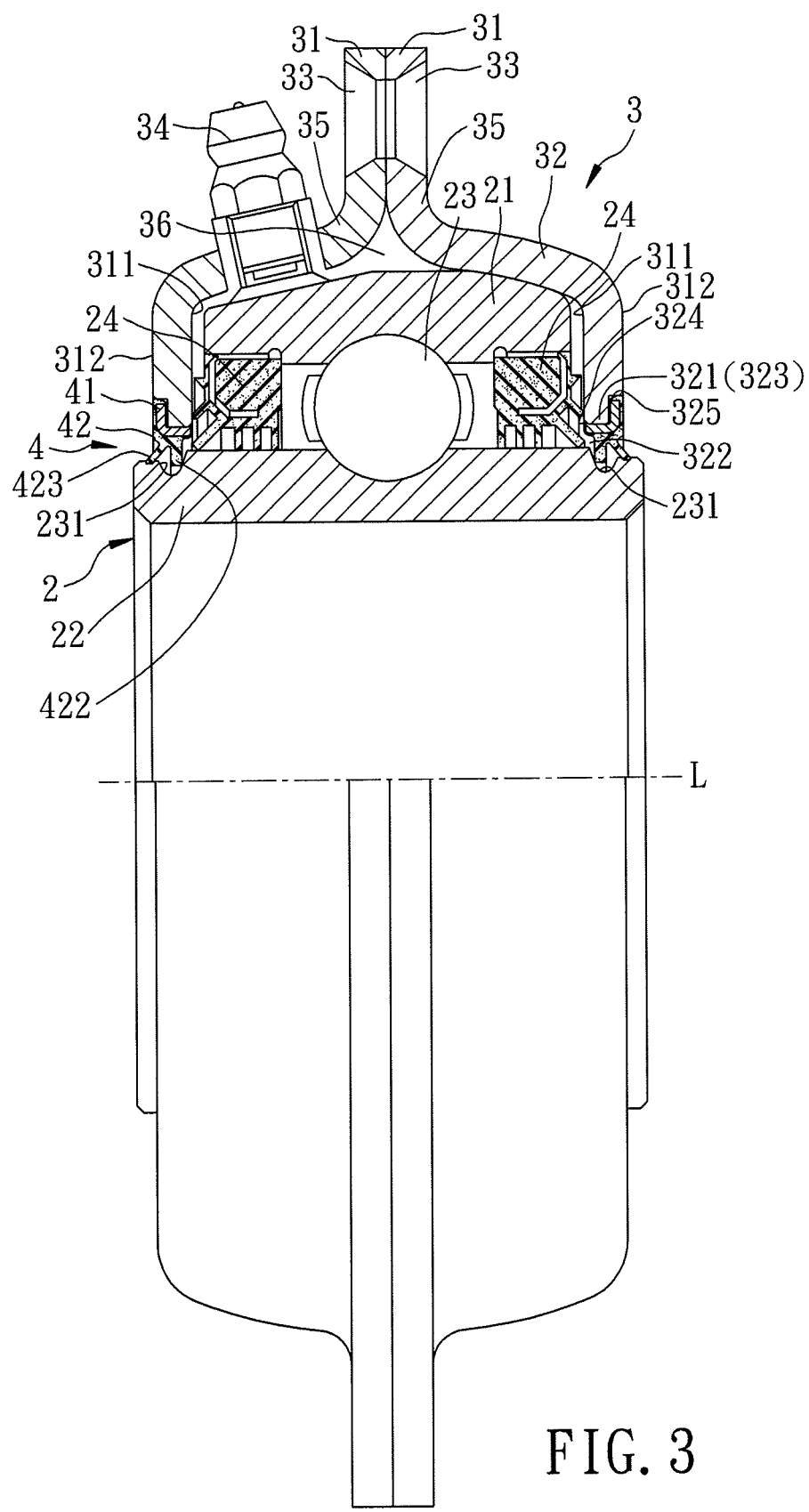
FIG. 3 is a partly sectional view of the preferred embodiment of FIG. 2.
Figure 4:
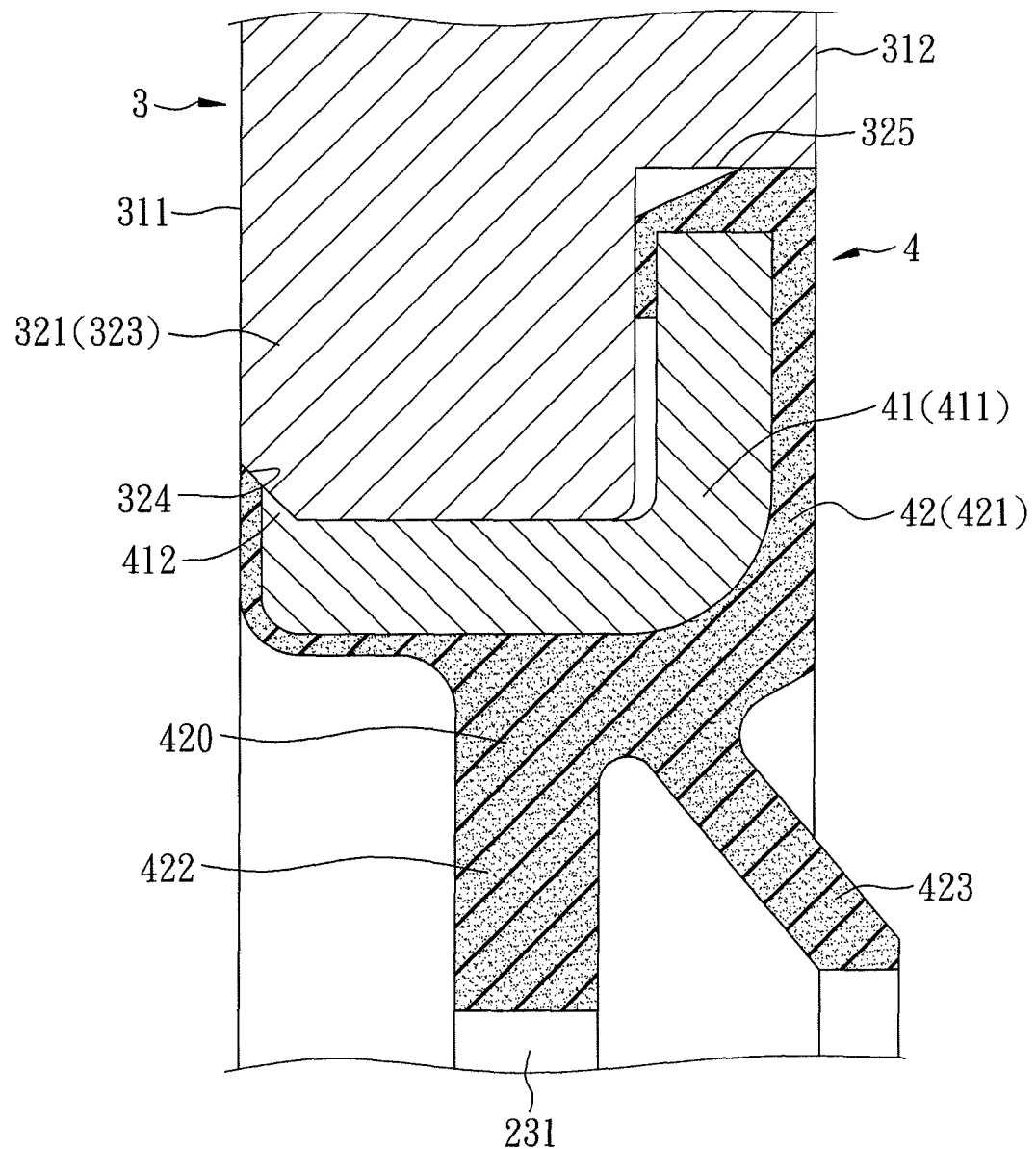
FIG. 4 is an enlarged fragmentary sectional view showing a structural relationship of a fixing ring and a flexible member of a dust-proof cover of the dust-proof housing device of the preferred embodiment of FIG. 2.

Referring to FIGS. 2 to 4, the preferred embodiment of a bearing assembly according to the present invention includes the dust-proof housing device and a bearing unit 2.

The dust-proof housing device encloses the bearing unit 2 and includes a housing body 3 and two dust-proof covers 4.

The housing body 3 includes two housing-half walls 31. Each of the housing-half walls 31 has a central hole 322 that defines an axis (L), and an inner peripheral end 321 surrounding the central hole 322.

The inner peripheral end 321 includes a stepped annular edge that interconnects outer and inner surfaces 311, 312 of a corresponding one of the housing-half walls 31 and that has an annular protrusion 323 projecting into the central hole 322 in proximity to the inner surface 311, a shoulder 325 proximate to the outer surface 312, and a chamfer 324 that is formed on the annular protrusion 323 and proximate to the inner surface 311.

In this embodiment, each of the housing-half walls 31 has a recessed wall portion 32 which is formed with the inner peripheral end 321, and an annular flange 35 that extends radially and outwardly from an outer periphery of the recessed wall portion 32. The annular flanges 35 of the housing-half walls 31 are stacked together. The recessed wall portions 32 of the housing-half walls 31 protrude axially from the annular flanges 35 in two opposite outward directions and cooperatively confine a receiving space 36. Preferably, the housing body 3 further has a plurality of mounting holes 33 that are disposed on the annular flanges 35, and at least one oil nozzle 34 that is attached to the recessed wall portion 32 of one of the housing-half walls 31. Therefore, when the annular flanges 35 of the housing-half walls 31 are stacked together, a plurality of fasteners, such as screws (not shown), are extended through the mounting holes 33 for securing together the two housing-half walls 31.

Each of the two dust-proof covers 4 has a fixing ring 41 fitted in the inner peripheral end 321 of a corresponding one of the housing-half walls 31, and an annular flexible member 42 secured to the fixing ring 41.

The fixing ring 41 has a main body portion 411 that has an L-shaped cross section and that is fitted in the stepped annular edge of one of the housing-half walls 31 substantially in a complementing manner, and a lip portion 412 that projects from the main body portion 411 and that engages the chamfer 324. In this embodiment, the fixing ring 41 may be made of a metal material.

The annular flexible member 42 has an enclosing portion 421 that encloses tightly the main body portion 411, and a flexible portion 420 projecting into the central hole 322 from the enclosing portion 421. Preferably, the flexible portion 420 has a radial flexible part 422 extending radially into the central hole 322, and an oblique flexible part 423 that is inclined outwardly away from the radial flexible part 422. In this embodiment, the annular flexible member 42 may be made of rubber.

Additionally, the bearing unit 2 has an outer ring 21 that is disposed between the housing-half walls 31, an inner ring 22 that is inserted in the outer ring 21 and around the axis (L), a plurality of balls 23 that are movably disposed between the outer ring 21 and the inner ring 22, and two dust-proof rings 24 that are disposed between the outer and inner rings 21, 22 on two axially opposite sides of the balls 23, respectively.

The inner ring 22 has two axially opposite grooves 231 that respectively correspond in position to the two dust-proof covers 4 and that extend around the axis (L), and the radial flexible parts 422 of the flexible members 42 respectively extend into the grooves 231.

By virtue of engagement of the radial flexible parts 422 of the flexible members 42 with the grooves 231, respectively, the dust-proof covers 4 of the dust-proof housing device of the present invention can prevent contaminants from contacting the bearing unit 2 and from contaminating the balls 23, thereby prolonging the service life of the bearing unit 2 and increasing the reliability of the bearing assembly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A dust-proof housing device for a bearing assembly, comprising:
   a housing body including two housing-half walls, each of which has a central hole defining an axis, and an inner peripheral end surrounding said central hole; and
   a dust-proof cover having a fixing ring fitted in said inner peripheral end of at least one of said housing-half walls, and an annular flexible member secured to said fixing ring;
   said inner peripheral end including a stepped annular edge that interconnects outer and inner surfaces of a corresponding one of said housing-half walls, said stepped annular edge having an annular protrusion projecting into said central hole in proximity to said inner surface, a shoulder proximate to said outer surface, and a chamfer formed on said annular protrusion and proximate to said inner surface; and
   said fixing ring having a main body portion that has an L-shaped cross section and that is fitted in said stepped annular edge in a complementing manner, and a lip portion that projects from said main body portion and that engages said chamfer.

2. The dust-proof housing device as claimed in claim 1, wherein said annular flexible member has an enclosing portion that encloses said main body portion, and a flexible portion projecting into said central hole from said enclosing portion.

3. The dust-proof housing device as claimed in claim 2, wherein said flexible portion has a radial flexible part extending radially into said central hole, and an oblique flexible part that is inclined outwardly away from said radial flexible part.

4. The dust-proof device as claimed in claim 1, wherein each of said housing-half walls has a recessed wall portion which is formed with said inner peripheral end, and an annular flange that extends radially and outwardly from an outer periphery of said recessed wall portion, said annular flanges of said housing-half walls being stacked together, said recessed wall portions of said housing-half walls protruding axially from said annular flanges in two opposite outward directions and cooperatively confining a receiving space, said housing body further having a plurality of mounting holes disposed on said annular flanges, and at least one oil nozzle attached to said recessed wall portion of one of said housing-half walls.

5. A bearing assembly, comprising:
   a bearing unit; and
   a dust-proof housing device enclosing said bearing unit, and including:
      a housing body including two housing-half walls, each of which having a central hole defining an axis, and an inner peripheral end surrounding said central hole; and
      two dust-proof covers each of which has a fixing ring fitted in said inner peripheral end of one of said housing-half walls, and an annular flexible member secured to said fixing ring;
   said inner peripheral end including a stepped annular edge that interconnects outer and inner surfaces of a corresponding one of said housing-half walls, said stepped annular edge having an annular protrusion projecting into said central hole in proximity to said inner surface, a shoulder proximate to said outer surface, and a chamfer formed on said annular protrusion and proximate to said inner surface; and
   said fixing ring having a main body portion that has an L-shaped cross section and that is fitted in said stepped annular edge in a complementing manner, and a lip portion that projects from said main body portion and that engages said chamfer.

6. The bearing assembly as claimed in claim 5, wherein said annular flexible member has an enclosing portion that encloses said main body portion, and a flexible portion projecting into said central hole from said enclosing portion.

7. The bearing assembly as claimed in claim 6, wherein said flexible portion has a radial flexible part extending radially into said central hole, and an oblique flexible part that is inclined outwardly away from said radial flexible part.

8. The bearing assembly as claimed in claim 5, wherein each of said housing-half walls has a recessed wall portion which is formed with said inner peripheral end, and an annular flange that extends radially and outwardly from an outer periphery of said recessed wall portion, said annular flanges of said housing-half walls being stacked together, said recessed wall portions of said housing-half walls protruding axially from said annular flanges in two opposite outward directions and cooperatively confining a receiving space, said housing body further having a plurality of mounting holes disposed on said annular flanges, and at least one oil nozzle attached to said recessed wall portion of one of said housing-half walls.

9. The bearing assembly as claimed in claim 7, wherein said bearing unit has an outer ring disposed between said housing-half walls, an inner ring inserted in said outer ring and around the axis, a plurality of balls movably disposed between said outer ring and said inner ring, and two dust-proof rings that are disposed between said outer and inner rings on two axially opposite sides of said balls, respectively.

10. The bearing assembly as claimed in claim 9, wherein said inner ring has two axially opposite grooves that respectively correspond in position to said two dust-proof covers and that extend around the axis, and said radial flexible parts of said flexible members respectively extend into said grooves.

* * * * *